United States Patent
Hamaya et al.

(10) Patent No.: US 10,435,569 B2
(45) Date of Patent: Oct. 8, 2019

(54) RARE EARTH ELEMENT OXYFLOURIDE POWDER SPRAY MATERIAL AND SPRAYED ARTICLE

(71) Applicant: SHIN-ETSU CHEMICAL CO., LTD., Tokyo (JP)

(72) Inventors: Noriaki Hamaya, Echizen (JP); Yasushi Takai, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/833,437

(22) Filed: Aug. 24, 2015

(65) Prior Publication Data

US 2015/0361540 A1    Dec. 17, 2015

Related U.S. Application Data

(62) Division of application No. 13/971,889, filed on Aug. 21, 2013, now abandoned.

(30) Foreign Application Priority Data

Aug. 22, 2012 (JP) .................................. 2012-183302

(51) Int. Cl.
    *C09D 5/18*      (2006.01)
    *C23C 4/11*      (2016.01)
    *C23C 4/134*      (2016.01)

(52) U.S. Cl.
    CPC .............. *C09D 5/18* (2013.01); *C23C 4/11* (2016.01); *C23C 4/134* (2016.01); *Y10T 428/24413* (2015.01); *Y10T 428/2982* (2015.01)

(58) Field of Classification Search
    CPC ........... C23C 4/105; C23C 4/134; C23C 4/11; C09D 5/18; Y10T 428/2982; Y10T 428/24413
    See application file for complete search history.

(56) References Cited

U.S. PATENT DOCUMENTS

| | | | |
|---|---|---|---|
| 6,596,397 B2 | 7/2003 | Kaneyoshi et al. | |
| 6,852,433 B2 | 2/2005 | Maeda | |
| 6,916,534 B2 | 7/2005 | Wataya et al. | |
| 7,700,060 B2 | 4/2010 | Kitamura et al. | |
| 8,075,860 B2 | 12/2011 | Kitamura et al. | |
| 2002/0015853 A1* | 2/2002 | Wataya | C01F 17/0062 428/469 |
| 2002/0160189 A1 | 10/2002 | Wataya et al. | |
| 2002/0177014 A1 | 11/2002 | Kaneyoshi et al. | |
| 2007/0077363 A1 | 4/2007 | Kitamura et al. | |
| 2009/0214825 A1 | 8/2009 | Sun et al. | |

FOREIGN PATENT DOCUMENTS

| | | |
|---|---|---|
| JP | 3523222 B2 | 4/2004 |
| JP | 4006596 B2 | 11/2007 |
| JP | 2011-514933 A | 5/2011 |
| JP | 2014-009361 A | 1/2014 |

OTHER PUBLICATIONS

Publication Offer Form dated Oct. 11, 2016, issued in Japanese Application No. 2015-40979, with English translation (19 pages).
Certified Experiment Result dated Oct. 11, 2016, issued in Japanese Application No. 2015-040979, with English translation (16 pages).
Notification dated Nov. 15, 2016, issued in Japanese Application No. 2015-040979.
Information Statement dated Oct. 31, 2014, submitted for Japanese Patent Application No. 2012-183302, 14 pages, w/English translation.
Ariyoshi. S., Ceritificate for Experimental Results, Reference Material 1, dated Sep. 10, 2014, 15 pages, (cited in Information Statement dated Oct. 31, 2014), w/English translation.

* cited by examiner

*Primary Examiner* — Nathan L Van Sell

(74) *Attorney, Agent, or Firm* — Westerman, Hattori, Daniels & Adrian, LLP

(57) ABSTRACT

A spray material comprising rare earth element oxyfluoride particles having an aspect ratio of up to 2, an average particle size of 10-100 μm, and a bulk density of 0.8-2 g/cm³, and containing not more than 0.5 wt % of carbon and 3-15 wt % of oxygen is suitable for air plasma spraying. An article having a sprayed coating of rare earth element oxyfluoride has high resistance against plasma etching and a long lifetime.

13 Claims, No Drawings

US 10,435,569 B2

RARE EARTH ELEMENT OXYFLOURIDE POWDER SPRAY MATERIAL AND SPRAYED ARTICLE

CROSS-REFERENCE TO RELATED APPLICATION

This is a divisional application of U.S. patent application Ser. No. 13/971,889, filed on Aug. 21, 2013, which claims priority under 35 U.S.C. § 119(a) on Patent Application No. 2012-183302 filed in Japan on Aug. 22, 2012, the entire contents of which are hereby incorporated by reference.

TECHNICAL FIELD

This invention relates to a thermal spraying material in the form of rare earth element oxyfluoride powder, especially suited for use to form a sprayed coating having high corrosion resistance in a corrosive plasma atmosphere as encountered in the semiconductor device fabrication process, and an article having a sprayed coating of the thermal spraying material.

BACKGROUND ART

In the prior art, sprayed coatings having high corrosion resistance are used for protecting substrates in a variety of service environments. While aluminum, chromium and similar metal oxides are often used as the thermal spray material, the sprayed coatings of these oxide materials are susceptible to corrosion upon exposure to hot plasma. These materials are thus inadequate for use in the semiconductor manufacturing process which may typically involve treatment in a halogen-based corrosive gas plasma atmosphere.

The halogen-based corrosive gas plasma atmosphere used in the fabrication of semiconductor devices contains fluorine-based gases such as $SF_6$, $CF_4$, $CHF_3$, $ClF_3$ and HF or chlorine-based gases such as $Cl_2$, $BCl_3$ and HCl.

Known articles which can be used in such extremely corrosive atmospheres include, for example, articles having corrosion resistant coatings formed thereon by spraying yttrium oxide (Patent Document 1) and yttrium fluoride (Patent Documents 2 and 3) to their surface. While rare earth element oxide sprayed articles are generally prepared by plasma spraying rare earth element oxide, they are long used as the sprayed articles in the industrial semiconductor fabrication process because of least technical problems. On the other hand, the rare earth element fluoride sprayed coatings suffer from a technical problem despite good corrosion resistance. The plasma spraying of rare earth element fluoride has the problem that when the rare earth element fluoride is passed through a flame at 3,000° C. or higher for melting, the fluoride can be decomposed so that the material partially converts to a mixture of rare earth element fluoride and rare earth element oxide. For this reason, practical utilization of rare earth element fluoride sprayed articles is delayed as compared with the rare earth element oxide sprayed articles.

CITATION LIST

Patent Document 1: JP 4006596 (U.S. Pat. No. 6,852,433)
Patent Document 2: JP 3523222 (US 20020015853)
Patent Document 3: JP-A 2011-514933 (US 20090214825)

Disclosure of Invention

An object of the invention is to provide a thermal spray material in the form of rare earth element oxyfluoride powder which is used to form sprayed coatings having higher corrosion resistance than conventional sprayed coatings of rare earth element oxide or fluoride, and a sprayed article having a sprayed coating of rare earth element oxyfluoride.

The inventors have found that a spray material comprising rare earth element oxyfluoride particles having an aspect ratio of up to 2 as shape index, an average particle size of 10 to 100 μm, and a bulk density of 0.8 to 2 $g/cm^3$, and containing not more than 0.5% by weight of carbon and 3 to 15% by weight of oxygen is effective for plasma spraying, and that better results are obtained by plasma spraying the rare earth element oxyfluoride spray material onto a substrate such that the sprayed coating may have a carbon content of up to 0.1% by weight and an oxygen content of 3 to 15% by weight.

In one aspect, the invention provides a spray material comprising rare earth element oxyfluoride particles having an aspect ratio of up to 2, an average particle size of 10 to 100 μm, and a bulk density of 0.8 to 2 $g/cm^3$, and containing not more than 0.5% by weight of carbon and 3 to 15% by weight of oxygen.

Preferably, the rare earth element is one or more elements selected from the group consisting of Y and Group 3A elements from La to Lu. Typically, the rare earth element is Y, Gd or Er.

The spray material is preferably obtained by mixing 10 to 70% by weight of rare earth element oxide particles having an average particle size of 0.01 to 5 μm and the balance of rare earth element fluoride particles having an average particle size of 0.1 to 5 μm, agglomerating, and firing.

In another aspect, the invention provides a rare earth element oxyfluoride-sprayed article comprising a substrate and a sprayed coating which is deposited on the substrate by plasma spraying the spray material defined herein, the sprayed coating having a carbon content of not more than 0.1% by weight and an oxygen content of 3 to 15% by weight.

Advantageous Effects of Invention

The spray material in the form of rare earth element oxyfluoride powder is amenable to atmospheric plasma spraying. An article having a sprayed coating of the rare earth element oxyfluoride has higher resistance against plasma etching than those articles having sprayed coatings of rare earth element oxide and fluoride when used in a halogen gas plasma. High corrosion resistance ensures a long lifetime.

DESCRIPTION OF EMBODIMENTS

One embodiment of the invention is a thermal spray material comprising rare earth element oxyfluoride particles having an aspect ratio of up to 2 as shape index, an average particle size of 10 μm to 100 μm, and a bulk density of 0.8 $g/cm^3$ to 2 $g/cm^3$, and containing not more than 0.5% by weight of carbon and 3% to 15% by weight of oxygen. This thermal spray material is effective for plasma spraying a rare earth element oxyfluoride in air. In general, the thermal spray powder should desirably meet the requirements including (1) smooth flow and (2) that the material is not decomposed into oxides by plasma spraying. The spray material defined herein has these advantages.

The thermal spray material should preferably comprise particles of spherical shape. When a spray material is fed into a flame for thermal spraying, a poor fluidity may make the material inconvenient to feed such as by clogging a feed tube. To ensure smooth flow, the spray material should preferably consist of spherical particles. The particles have an aspect ratio of up to 2, preferably up to 1.5. The "aspect ratio" is used herein as one shape index of the three dimensions and refers to a ratio of length to breadth of a particle.

The rare earth element used in the rare earth element oxyfluoride spray material may be selected from among yttrium (Y) and Group 3A elements inclusive of lanthanum (La) to lutetium (Lu). Of these, yttrium (Y), gadolinium (Gd) and erbium (Er) are preferred. A mixture of two or more rare earth elements is also acceptable. When such a mixture is used, the spray material may be obtained by agglomerating a mixture of raw materials, or by forming particles of a single element and mixing such particles of different elements prior to use.

The spray material has an average particle size of 10 μm to 100 μm, preferably 15 μm to 60 μm. As used herein, the average particle size is determined as a weight average value $D_{50}$ (i.e., a particle diameter or median diameter when the cumulative weight reaches 50%) by a particle size distribution measurement unit based on the laser light diffractometry. If the particle size of spray material is too small, such particles may evaporate in the flame, resulting in a lower yield of spraying. If the size of spray material is too large, such particles may not be completely melted in the flame, resulting in a sprayed coating of deteriorated quality.

Particles as agglomerated to constitute the spray material should be solid, i.e., filled to the interior (or free of voids), because solid particles are stable (or do not chip or collapse) during handling, and because the problem arising from voids in particles that undesirable gas component can be trapped in voids is avoidable. In this respect, the spray material should have a bulk density of 0.8 g/cm$^3$ to 2 g/cm$^3$, preferably 1.2 g/cm$^3$ to 1.8 g/cm$^3$.

The atmospheric plasma spraying of rare earth element oxyfluoride has a possibility that the oxyfluoride is decomposed into oxide. Particularly when the spray material (or powder) contains a noticeable amount of water or hydroxyl, it facilitates decomposition of the oxyfluoride into a rare earth element oxide and the liberated fluorine forms a gas such as hydrogen fluoride. The resulting sprayed coating becomes a mixture of rare earth element oxide and rare earth element fluoride. In this regard, the raw material to be agglomerated into the spray powder should preferably have a water or hydroxyl content of up to 10,000 ppm, more preferably up to 5,000 ppm, and even more preferably up to 1,000 ppm.

The spray material (or powder) contains carbon in a concentration of not more than 0.5% by weight, preferably not more than 0.3% by weight, and more preferably not more than 0.1% by weight. If the carbon content is too high, such carbon can react with oxygen of the rare earth element oxyfluoride to form carbon dioxide, causing decomposition of the rare earth element oxyfluoride. As long as the carbon content is limited low, decomposition of the rare earth element oxyfluoride during thermal spraying is inhibited and a satisfactory coating of rare earth element oxyfluoride is deposited.

The rare earth element oxyfluoride spray material defined above can be prepared by agglomerating (or granulating) rare earth element oxyfluoride or by mixing rare earth element oxide and rare earth element fluoride and agglomerating the mixture. For example, the spray material is prepared by dispersing a starting powder in a solvent such as water or an alcohol of 1 to 4 carbon atoms to form a slurry having a concentration of 10 to 40% by weight and agglomerating the slurry by spray drying or analogous technique. When rare earth element oxide and rare earth element fluoride are mixed, the mixture may consist of 10 to 70% by weight of rare earth element oxide and the balance of rare earth element fluoride.

Alternatively, the spray material may be prepared by mixing a rare earth element oxyfluoride with an organic polymer serving as a binder such as carboxymethyl cellulose and deionized water to form a slurry and agglomerating by spray drying or analogous technique. Examples of the binder used herein include polyvinyl alcohol and polyvinyl pyrrolidone as well as carboxymethyl cellulose. The binder is typically added in an amount of 0.05 to 10% by weight based on the weight of the rare earth element oxyfluoride to form a slurry.

The particles as agglomerated are fired at a temperature of 600° C. to 1600° C. in air, vacuum or an inert gas atmosphere for the purpose of removing the binder and water. Firing in an oxygen-containing atmosphere is preferred for carbon removal.

By plasma spraying the resulting spray material to a substrate, a rare earth element oxyfluoride-sprayed article is obtainable. The sprayed coating on the substrate should have a carbon content of not more than 0.1% by weight, preferably 0.01 to 0.03% by weight and an oxygen content of 3 to 15% by weight, preferably 5 to 13% by weight.

Thermal spraying to a component of the semiconductor fabrication equipment is desirably atmospheric plasma spraying or vacuum plasma spraying. The plasma gas used herein may be nitrogen/hydrogen, argon/hydrogen, argon/helium, argon/nitrogen, argon alone, or nitrogen gas alone, but not limited thereto. Examples of the substrate subject to thermal spraying include, but are not limited to, substrates of aluminum, nickel, chromium, zinc, and alloys thereof, alumina, aluminum nitride, silicon nitride, silicon carbide, and quartz glass which constitute components of the semiconductor equipment. The sprayed coating typically has a thickness of 50 to 500 μm. The conditions under which the rare earth element oxyfluoride powder is thermally sprayed are not particularly limited. The thermal spraying conditions may be determined as appropriate depending on the identity of substrate, a particular composition of the rare earth element oxyfluoride spray material, and a particular application of the resulting sprayed article.

The resulting sprayed article has higher resistance against plasma etching (i.e., corrosion resistance) than sprayed coatings of rare earth element oxide and fluoride. Thus a long lifetime is available.

EXAMPLE

Examples are given below by way of illustration and not by way of limitation.

Examples 1 to 4 and Comparative Examples 1 and 2

Preparation of Spray Powder

A spray powder material was obtained by providing a starting powder or mixing ingredients in a predetermined ratio to form a starting powder as shown in Table 1, dispersing the starting powder in a binder (Table 1) to form a slurry, agglomerating in a spray dryer, and firing under selected conditions (Table 1). The resulting spray powder was measured for particle aspect ratio, particle size distribution, bulk density, and oxygen, fluorine and carbon concentrations. The results are shown in Table 1. Notably, the particle size distribution was measured by the laser diffraction method, the fluorine concentration analyzed by dissolution ion chromatography, and the carbon and oxygen concentrations analyzed by the combustion and infrared (IR) spectroscopy method. The aspect ratio of particles was determined by taking a scanning electron microscope (SEM) photo, measuring the length and breadth of 180 particles in the photo, and averaging.

Preparation of Sprayed Article

The spray powder materials in Examples 1 to 4 and Comparative Examples 1 and 2 were air plasma sprayed to aluminum substrates using a gas mixture of 40 L/min of argon and 5 L/min of hydrogen. The resulting articles had a sprayed coating of about 200 μm thick. The sprayed coatings of powder materials in Examples 1 to 4 looked black, whereas the sprayed coatings of powder materials in Comparative Examples 1 and 2 were white. The carbon and oxygen concentrations of each sprayed coating were measured by the combustion and IR method. The results are shown in Table 1.

Corrosion Resistance Test

Each article was masked with masking tape to define a masked and exposed section before it was mounted on a reactive ion plasma tester. A plasma corrosion test was performed under conditions: frequency 13.56 MHz, plasma power 1,000 watts, gas mixture $CF_4+O_2$ (20 vol %), flow rate 50 sccm, gas pressure 50 mTorr, and time 12 hours. At the end of the test, a step formed between the exposed and masked sections due to corrosion. The height of the step was measured at 4 points by a laser microscope and averaged as an index for corrosion resistance. The results are shown in Table 1.

As is evident from Table 1, the sprayed coatings obtained from the rare earth element oxyfluoride powder materials in Examples 1 to 4 have higher resistance against plasma etching (corrosion resistance) than the sprayed coatings from the rare earth element oxide and fluoride in Comparative Examples 1 and 2.

Japanese Patent Application No. 2012-183302 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for manufacturing a spray material, comprising:
    mixing rare earth element oxide particles and rare earth element fluoride particles to form a slurry, the rare earth element oxide has an average particle size of 0.01 to less than 3 μm, and the rare earth element fluoride has an average particle size of 0.1 to less than 3 μm,
    agglomerating the mixture of the rare earth element oxide particles and the rare earth element fluoride particle to form agglomerated particles from the slurry, and
    firing the agglomerated particles to form a spray powder material.

2. The method of claim 1, wherein an amount of the rare earth element oxide is 10 to 70% by weight, and an amount of the rare earth element fluoride is the balance.

3. The method of claim 1, wherein the particles after the firing have an aspect ratio of up to 2, an average particle size of 10 to 100 μm, and a bulk density of 0.8 to 2 g/cm$^3$, and wherein the particles after the firing contain no more than 0.5% by weight of carbon and 3 to 15% by weight of oxygen.

TABLE 1

|  |  | Example | | | | Comparative Example | |
| --- | --- | --- | --- | --- | --- | --- | --- |
|  |  | 1 | 2 | 3 | 4 | 1 | 2 |
| Start powder, particle size $D_{50}$ |  | $Y_2O_3$ 15 wt % 0.3 μm YF$_3$ 85 wt % 1.8 μm | YOF 100 wt % 2.0 μm | $Gd_2O_3$ 30 wt % 1.1 μm $GdF_3$ 70 wt % 1.5 μm | $Er_2O_3$ 40 wt % 0.3 μm $ErF_3$ 60 wt % 2.5 μm | $Y_2O_3$ 100 wt % 1.0 μm | YF$_3$ 100 wt % 2.0 μm |
| Agglomeration | Start powder | 30 wt % | 20 wt % | 25 wt % | 35 wt % | 35 wt % | 25 wt % |
|  | Binder* | CMC 12 wt % | CMC 8 wt % | PVP 8 wt % | PVA 5 wt % | CMC 10 wt % | CMC 5 wt % |
| Firing | Atmosphere | Air | $N_2$ | Air | Vacuum | Air | Air |
|  | Temperature | 800° C. | 900° C. | 900° C. | 900° C. | 1500° C. | 800° C. |
|  | Time | 4 h | 3 h | 3 h | 6 h | 15 h | 20 h |
| Analysis of spray powder | Aspect ratio | 1.2 | 1.5 | 1.3 | 1.3 | 1.5 | 1.5 |
|  | $D_{10}$ | 26 μm | 18 μm | 25 μm | 30 μm | 17 μm | 35 μm |
|  | $D_{50}$ | 46 μm | 28 μm | 48 μm | 50 μm | 30 μm | 57 μm |
|  | $D_{90}$ | 68 μm | 48 μm | 75 μm | 80 μm | 46 μm | 80 μm |
|  | Bulk density | 1.4 g/cm$^3$ | 1.3 g/cm$^3$ | 1.6 g/cm$^3$ | 1.8 g/cm$^3$ | 1.6 g/cm$^3$ | 1.5 g/cm$^3$ |
|  | Oxygen | 4 wt % | 13 wt % | 4 wt % | 5 wt % | 21.3 wt % | 0.5 wt % |
|  | Fluorine | 31 wt % | 16 wt % | 23 wt % | 20 wt % | 0 wt % | 38 wt % |
|  | Carbon | 0.01 wt % | 0.01 wt % | 0.01 wt % | 0.01 wt % | 0.01 wt % | 0.1 wt % |
| Analysis of sprayed coating | Oxygen | 6 wt % | 13 wt % | 6 wt % | 8 wt % | 21 wt % | 2 wt % |
|  | Carbon | 0.02 wt % | 0.01 wt % | 0.02 wt % | 0.02 wt % | 0.05 wt % | 0.11 wt % |
| Corrosion resistance, step |  | 3.6 μm | 3.7 μm | 3.8 μm | 4.2 μm | 4.7 μm | 5.1 μm |

*Carboxymethyl cellulose, polyvinyl alcohol, and polyvinyl pyrrolidone are abbreviated as CMC, PVA, and PVP, respectively.

4. The method of claim 1, wherein a rare earth element of the rare earth element oxide and/or the rare earth element fluoride is selected from the group consisting of Y and Group 3A elements from La to Lu.

5. The method of claim 4, wherein the rare earth element is selected from the group consisting of Y, Gd and Er.

6. The method of claim 1, wherein, in the mixing step, an organic polymer is further mixed as a binder.

7. The method of claim 6, wherein the organic polymer is selected from the group consisting of carboxymethyl cellulose, polyvinyl alcohol and polyvinyl pyrrolidone.

8. The method of claim 1, wherein in the agglomerating step, the mixture in the slurry is agglomerated by spray drying.

9. The method of claim 1, wherein in the firing step, the agglomerated particles are fired at a temperature of 600° C. to 1600° C. in air, vacuum or an inert gas atmosphere.

10. The method of claim 1, wherein the rare earth element oxide has an average particle size of 0.01 to 1.1 μm, and the rare earth element fluoride has an average particle size of 0.1 to 2.5 μm.

11. The method of claim 1, wherein an amount of the rare earth element oxide is 10 to 40% by weight, and an amount of the rare earth element fluoride is the balance.

12. The method of claim 1, wherein the particles after the firing have an aspect ratio of up to 2, an average particle size of 10 to 100 μm, and a bulk density of 0.8 to 2 g/cm$^3$, and wherein the particles after the firing contain not more than 0.5% by weight of carbon and 3 to 5% by weight of oxygen.

13. The method of claim 1, wherein water or hydroxyl content in the spray powder material is up to 10,000 ppm.

* * * * *